CONTACT ASSEMBLY WITH THERMOPLASTIC BACKING STRIP

Filed Feb. 26, 1962 3 Sheets-Sheet 1

INVENTOR
HERBERT E. RUEHLEMANN
BY Harry Langsam
Stanley Bilker
ATTORNEYS

CONTACT ASSEMBLY WITH THERMOPLASTIC BACKING STRIP

Filed Feb. 26, 1962 3 Sheets-Sheet 2

INVENTOR
HERBERT E. RUEHLEMANN

BY Harry Langsam
Stanley Bilker
ATTORNEYS

May 4, 1965 H. E. RUEHLEMANN 3,182,276

CONTACT ASSEMBLY WITH THERMOPLASTIC BACKING STRIP

Filed Feb. 26, 1962 3 Sheets-Sheet 3

INVENTOR.
HERBERT E. RUEHLEMANN
BY
Caesar and Rivise
ATTORNEYS

United States Patent Office 3,182,276
Patented May 4, 1965

3,182,276

CONTACT ASSEMBLY WITH THERMOPLASTIC BACKING STRIP

Herbert E. Ruehlemann, Huntingdon Valley, Pa., assignor to Elco Corporation, Willow Grove, Pa., a corporation of Pennsylvania Filed Feb. 26, 1962, Ser. No. 176,496
5 Claims. (Cl. 339—17)

This application is a continuation-in-part based on application Serial No. 686,974, filed September 30, 1957 and now abandoned.

My invention relates to printed circuit electrical contacts, and it relates particularly to an assembly of such contacts, as well as the method of arranging them in such assembly and the method of affixing them to printed circuit boards while they are retained in such assembly.

Printed circuits of the type which have come into rather extensive use in various sorts of electronic apparatus are comprised of an electrically insulating base or panel upon which strips of electrically conductive material are deposited or printed. These strips are of various shapes and forms depending upon the needs of a particular manufacturer of electronic equipment or parts, and usually the strips are quite close together.

Electrical contacts of the type disclosed in the Fox Patent No. 2,750,572 and having forked ends which mate in crossed relation have been found especially advantageous for use with printed circuit boards. Each such contact can be secured to a printed circuit board in electrical engagement with a different one of the conductive strips thereon. However, to mount such contacts on a printed circuit board individually presents problems of handling and cost.

Accordingly, it is an object of my invention to provide a novel assembly of such contacts whereby they can be handled in multiple arrays for quick and efficient application to printed circuit boards either singly or simultaneously in groups of two or more.

Another object of my invention is to provide a novel assembly of contacts as aforesaid which lends itself well to accommodation to various types and sizes of printed circuit boards.

Another object of my invention is to provide an improved method of mounting and retaining such contacts for handling in multiple groups or units.

Another object of my invention is to provide an improved method of applying and affixing groups of two or more of such contacts simultaneously to printed circuit boards.

Other objects of my invention are to provide an improved contact assembly and method of producing the same, as well as an improved method of handling the contacts in groups of affixing them to printed circuit boards, all of which can be accomplished easily and economically, which are highly efficient, and which will provide sturdy, and efficient combinations of printed circuit boards and contacts.

With the above and related objects in view, my invention consists in the details of construction and combination of parts, and details of steps, as will be more fully understood from the following description, when read in conjunction with the accompanying drawings, in which.

Figures 1, 2, 3:
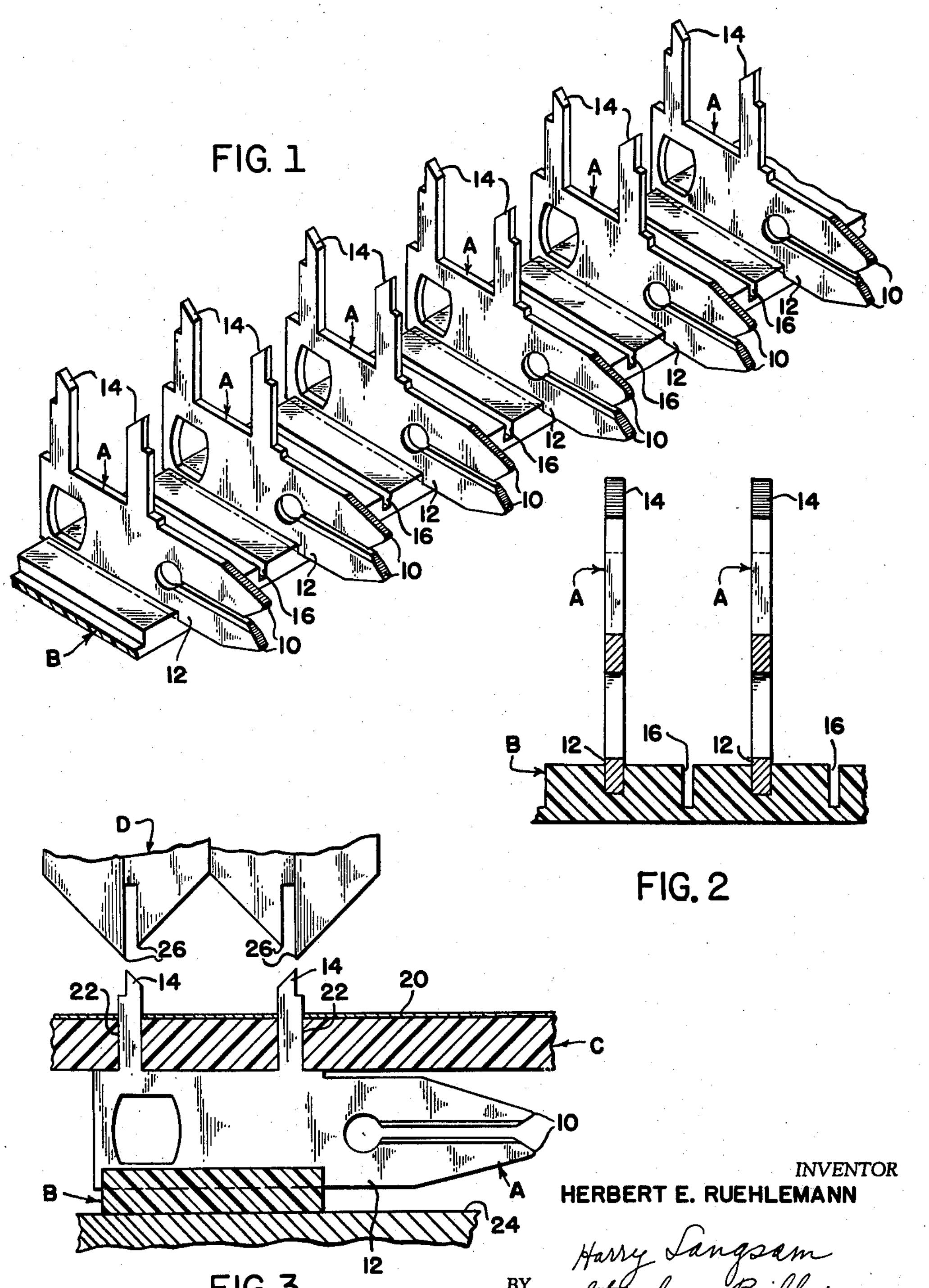
FIG. 1 is a perspective view of an assembly of contacts in accordance with a first embodiment of my invention.
FIG. 2 is a fragmentary sectional view taken along the line 2—2 of FIG. 1.
FIG. 3 is a sectional view showing the manner in which such an assembly of contacts can be simultaneously applied and affixed to a printed circuit board.

Referring, now, in greater detail to the drawing, I have shown in FIG. 1, by way of example, a plurality of like or identical, flat, electrical contacts A of the type mentioned above, but designed for use particularly with printed circuit boards. Each contact A has a forked part 10 which is adapted to mate in crossed relation with the corresponding forked part of another contact in the manner disclosed in the above-identified Fox Patent No. 2,750,572. Each contact A also has a head portion 12 and a pair of oppositely extending legs 14 to be extended through a printed circuit board, as will be more fully set forth hereinafter.

To hold a multiplicity of contacts A assembled for handling as a group so that they can all be applied simultaneously to the printed circuit board, they are mounted in parallel, spaced relation on a retaining or holding strip B of thermoplastic, insulating material which is relatively hard, though somewhat flexible, at room temperature, but which becomes relatively soft at a higher temperature. I have found such materials as that sold commercially under the name "Plexiglas" by Rohm and Haas Company of Philadelphia, Pennsylvania, useful for this purpose, but other suitable material with similar properties may be employed.

To prepare the contact assembly, an elongated strip B is heated to a temperature at which it becomes softened enough to permit fairly easy penetration of the contacts thereinto. This may be accomplished by pre-heating the contacts themselves. The contacts A are first arranged (as by means of a comb-like jig or fixture, not shown) in parallel, spaced relation with all their forked parts 10 in alignment and extending in the same direction, with their head portion 12 similarly aligned, and with their legs 14 also correspondingly aligned. The metal contacts A are then heated to a temperature at which the plastic strip B will soften and they are brought into engagement with the strip B at their head portions. The contacts are then forced partially into the strip B under pressure to removably embed them in the strip. The strip B is thereafter cooled to restore it to its hard, room temperature condition whereupon the contacts are firmly retained thereon. In this form, the contacts can be dispensed to the trade for mounting on printed circuit boards as desired and in any numbers simultaneously.

Any number of contacts A may be applied to the strip B depending on its length. To enable a manufacture of electronic equipment to make use of strips of desired length (i.e., contacts of desired number), the strip B may be provided with weakened lines 16 between adjacent contacts A. The lines 16 may be molded into the strip, cut therein, or formed in any other suitable way, as by means of ribs on the heated comb-like fixture which holds the contacts in place during application thereof to the strip B. All one needs to do, then, to obtain a strip length bearing a desired number of contacts is to break the strip at any desired one of the lines 16.

An assembly of contacts as described above can be applied readily to a printed circuit board and affixed thereto. For this purpose, an insulated printed circuit board C having printed, electrically-conductive strips 20 thereon is formed with openings 22 at the strips 20 precisely spaced from each other to correspond to the spacing of the legs 14 and of a diameter just large enough to receive the legs 14 therein freely. The contact legs 14 are inserted into the openings 22 and the strip A is then placed on a table or other suitable support 24. A staking tool D having knife edges 26 is then brought down against the protruding legs 14 to "shave" the side edges of the legs 14 and stake them against the strips 20, as best seen in FIG. 3. Thus, the contacts become firmly affixed to the board D both mechanically and electrically. After the contacts have been staked to the board D, the plastic strip B can be readily removed by pulling it way from the contacts A. It can be seen, therefore, that a multiplicity of contacts A can be readily applied simultaneously to a printed circuit board by first mounting them on a holding or retaining strip B as above described.

In some instances, it may be desirable to employ contacts having only a single leg 14A. In such cases, the flat contacts A1 are mounted in a holder comprising a connector assembly designated H and comprising a pair of end pieces 30 joined with a desired number of intermediate pieces 32 somewhat in the manner disclosed in the above-identified Fox Patent No. 2,750,572. The contacts A1 are confined between adjacent pieces 30, 32 with their respective single legs 14A protruding therefrom. A printed circuit board C with suitably spaced openings therein to receive the legs 14A is provided, and the legs 14A are inserted into such openings. The staking tool D is then brought down against the legs 14A as above described to stake the contacts to the board D and thus affix the connector assembly 30, A1, 32 thereto. The connector assembly H can be suitably supported on table or other support 24 during this operation.

Figures 4, 5, 6:
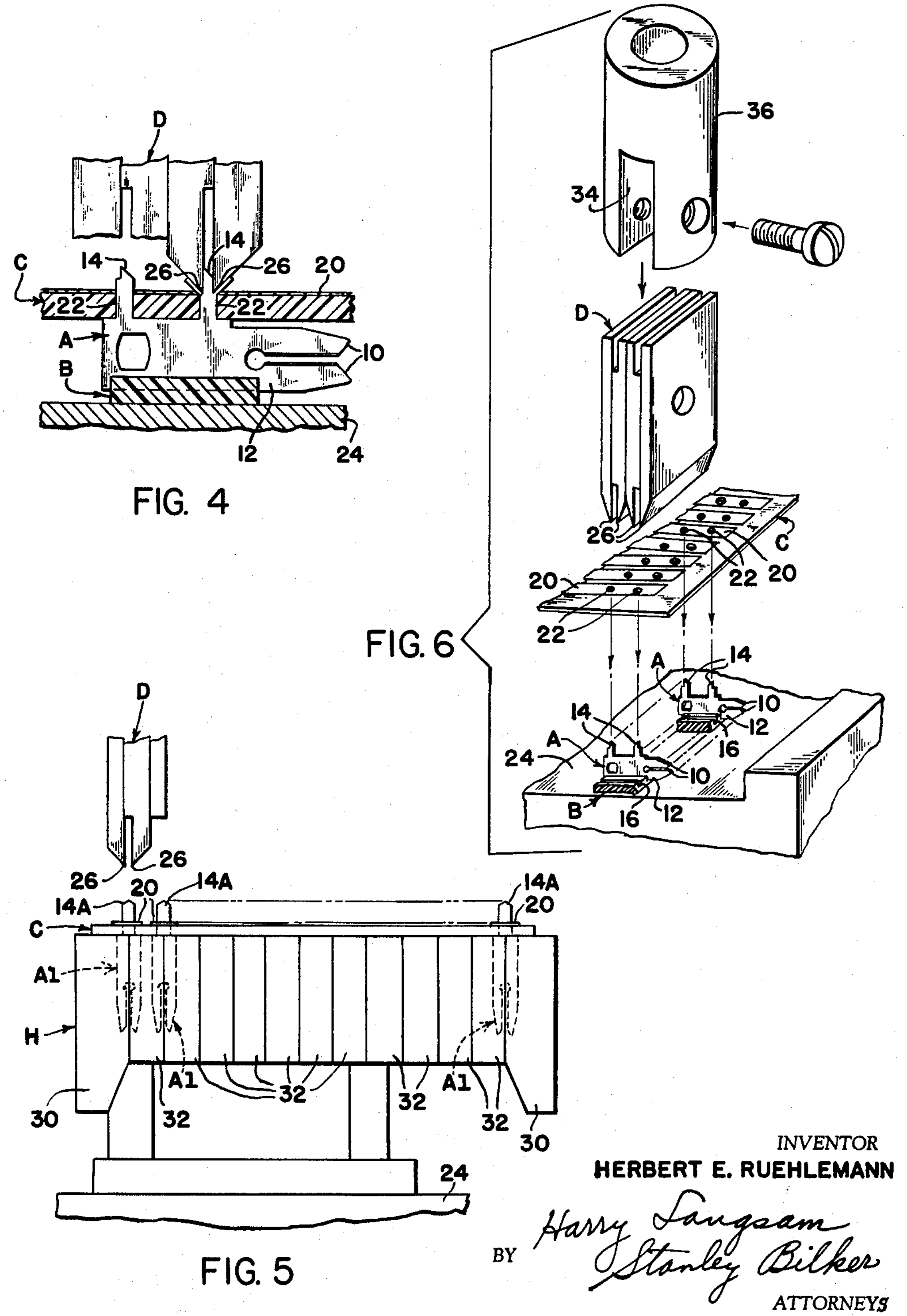
FIG. 4 is an enlarged end view showing the staking operation nearing completion for one of the legs of a two-leg contact in securing the contact to a printed circuit board.
FIG. 5 is a diagrammatic view showing how a plurality of contacts can be handled in accordance with my present invention.
FIG. 6 is an exploded, perspective view of one form of apparatus for handling contacts in accordance with my present invention.

FIG. 6 shows in detail the apparatus for, and method of, simultaneously assemblying a group or multiplicity of two-legged contacts A to a printed circuit board C. With the legs 14 of the contacts extending through the openings 22 in the board C and the strip B resting on the support 24, which may be the press platen of an arbor press, for example, the staking tool D is brought down against the legs 14 as above described. The tool D may be held in the slot 34 of a holder 36 by means of a screw 38, the holder 36 being connected to the ram of the press in any suitable manner for operation thereby.

Figures 7, 8, 9, 10:
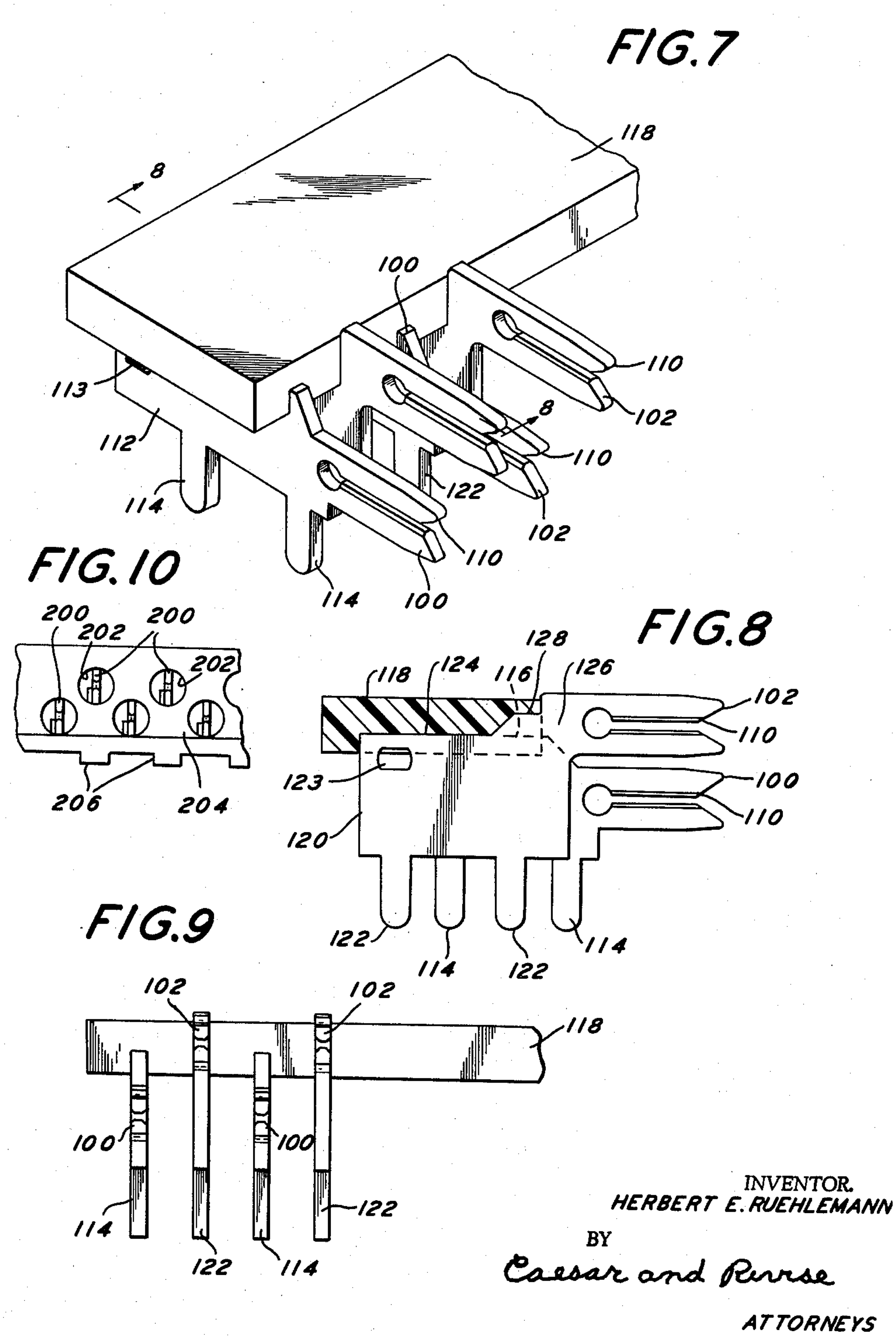
FIG. 7 is a fragmentary perspective view of an assembly of contacts in accordance with a second embodiment of my invention.
FIG. 8 is a sectional view taken along the lines 8—8 of FIG. 7.
FIG. 9 is a fragmentary front elevational view of the device of FIG. 7.
FIG. 10 is a fragmentary front elevational view of a third embodiment of my invention.

The second embodiment of my invention is generally shown in FIGS. 7, 8 and 9. In the assembly of FIG. 7 the contacts 100 and 102 are basically similar to the contacts A of FIGS. 1 to 6.

Each of the contacts 100 and 102 has a forked part 110 similar to forked part 10 of contacts A.

Each contact 100 (FIG. 7) has a head portion 112 and a pair of legs 114 depending therefrom to a printed circuit board as was previously explained. The upper edge 116 of head 112 of contact 100 is secured in plastic strip 118 in a manner and for the reasons previously discussed.

Each contact 102 (FIG. 8) has a head portion 120 and a pair of legs 122 depending therefrom for securement to a printed circuit board as was previously explained. The head portion 120 of contact 102 as well as the head portion 112 of contact 100 have openings 123 and 113 respectively formed in portions therein. These openings permit a soldering of leads from the outside circuits to the contacts. The upper edge 124 of head 120 of contact 102 includes a neck portion 126 extending upwardly and forwardly therefrom. The forked part 110 of the contact extends forwardly from the neck portion 126.

As shown in FIG. 8 the upper edge 124 of the head 120 and the edge 128 defining the upper limits of the neck portion 126 are secured in plastic strip 118 in a manner similar to the securement of upper edge 116.

As shown in FIG. 7, the contacts 100 and 102 are alternatively spaced from each other. Of course other patterns and spacings may be employed where desirable. In addition, the forked part of contacts 102 as shown in FIG. 8 is vertically spaced above the forked part of contacts 100. Consequently, two rows of contacts are vertically spaced in the assembly of FIG. 7. Additional rows of contacts may be added where desired.

The assembly of contacts of FIGS. 7 and 9 may be readily applied to a printed circuit board and affixed thereto as was previously discussed. With the embodiment of FIGS. 7 and 9, two vertical rows of contacts may be simultaneously applied to a printed circuit board.

As was previously discussed, the plastic strip 118 may be readily removed by pulling it away from the contacts 100 and 102. Where desired, in any embodiment of this invention, the plastic strip need not be separated from the contacts in order to enhance the stability and rigidity of the contacts as affixed to the printed circuit board.

It is to be further noted that the contacts of all embodiments of this invention may be precisely spaced from each other in order that the legs of the contacts will fit in precisely spaced openings in the printed circuit board.

The third embodiment of my invention is generally shown in FIG. 10. In this embodiment of the invention, the contacts 200 are substantially identical with each other and possess a forked part similar to forked part 10 of contacts A.

The contacts 200, however, do not possess any legs but merely comprise a forked part located in openings 202 in a plastic strip 204 and a head extending backwardly therefrom.

It is to be noted that the openings 202 are formed in two rows, vertically spaced from each other in an alternating pattern. Other patterns and spacings will occur to those skilled in the art. The contacts 200 may be secured in the openings 202 by means of the heating techniques previously discussed or the openings 202 may have a shoulder projection therein against which a lance or other locking member 204 abuts to lock the contacts 200 in the openings 202. The lower edge of the plastic strip 204 has tabs 206 projecting therefrom. The tabs 206 mate in complementary grooves in the casing. Thus, the assembly of FIG. 10 may be quickly secured in the casing of a connector member to complete the assembly of a connector member in a very quick fashion.

From the foregoing description, it will be apparent that I have provided a novel and simple way of assembling a plurality of electrical contacts for handling thereof as a group and simultaneous application thereof to a printed circuit board. Of course, if desired, only a single contact can be applied by this method also. Furthermore, while I have shown and described certain features of my invention in considerable detail, it should be understood that many variations thereof are possible. Other variations within the spirit of my invention will, no doubt, be readily apparent to those skilled in the art. Hence, I desire that the foregoing should be taken merely as illustrative and not in a limiting sense.

What is claimed as the invention is:

1. An assembly of electrical contacts comprising, in combination, a thin hard, but somewhat flexible self-supporting thermoplastic backing strip, a plurality of small individual contacts removably and partially embedded in said backing strip in parallel spaced relationship from each other, said contacts being of substantially flat stock and disposed in an inverted upstanding position in extending away from said strip, said contacts including at least one mounting leg, edge portions of said contacts being embedded in said strip with said mounting legs extending freely away from said backing strip, said backing strip being adapted to be severed at any desired point to provide a contact assembly having a predetermined number of contacts, said assembly being fastened through said mounting legs to a printed circuit board.

2. The invention of claim 1 wherein said strip is permitted to remain with said contacts.

3. The invention of claim 1 wherein said backing strip is provided with weakened break lines between adjacent contacts.

4. The invention of claim 1 wherein said contacts are precisely positioned with respect to each other on said backing strip in order to be applied at precise points on a printed circuit board.

5. The invention of claim 1 wherein said contacts are provided in two spaced rows in alternating relationship.

References Cited by the Examiner

UNITED STATES PATENTS

| | | | |
|---|---|---|---|
| 1,325,325 | 12/19 | Janke | 29—205 |
| 1,739,246 | 12/29 | Majce | 156—275 |
| 1,952,554 | 3/34 | Lavarack | 339—198 |
| 1,984,036 | 12/34 | Schwartzmann | 339—198 X |
| 2,096,750 | 10/37 | Lawrence | 156—264 |
| 2,251,326 | 8/41 | Cullin | 29—155.54 |
| 2,396,725 | 3/46 | Thomas | 339—59 |
| 2,760,176 | 8/56 | Del Camp | 339—17 X |
| 2,839,774 | 6/58 | Rand | 206—59 |
| 2,864,977 | 12/58 | Witt et al. | 339—17 X |
| 2,994,056 | 7/61 | Fox | 339—17 |

FOREIGN PATENTS

| | | |
|---|---|---|
| 611,257 | 10/48 | Great Britain. |

OTHER REFERENCES

Elco "Electrical Design News," March 1958, page 24.

JOSEPH D. SEERS, *Primary Examiner.*

ALFRED S. TRASK, *Examiner.*